United States Patent [19]

Ross et al.

[11] Patent Number: 4,820,007
[45] Date of Patent: Apr. 11, 1989

[54] CABLE CLOSURE AND METHODS OF ASSEMBLING

[75] Inventors: Robert R. Ross, Gainsville; Ilona Vedejs, Duluth, both of Ga.

[73] Assignee: American Telephone and Telegraph Company AT&T Bell Laboratories, Murray Hill, N.J.

[21] Appl. No.: 155,194

[22] Filed: Feb. 12, 1988

[51] Int. Cl.$^4$ .......................... G02B 6/36; H01R 4/00
[52] U.S. Cl. ............................. 350/96.20; 350/96.22; 350/96.21; 350/96.23; 350/320; 174/70 R; 174/91; 439/577
[58] Field of Search ............... 350/96.20, 96.21, 96.22, 350/96.23, 320; 174/70 R, 76, 88 R, 91; 439/577

[56] References Cited

U.S. PATENT DOCUMENTS

| | | | |
|---|---|---|---|
| 3,254,153 | 5/1966 | Kohler | 174/91 |
| 3,373,397 | 3/1968 | Renshaw, Jr. | 174/91 |
| 3,392,363 | 7/1968 | Geis, Jr. et al. | 174/91 |
| 3,772,635 | 11/1973 | Frey et al. | 439/403 X |
| 4,171,867 | 10/1979 | Cocito | 350/96.21 |
| 4,287,386 | 9/1981 | Scahill et al. | 174/76 |
| 4,332,435 | 6/1982 | Post | 350/96.20 |
| 4,359,262 | 11/1982 | Dolan | 350/96.20 |
| 4,373,776 | 2/1983 | Purdy | 350/96.20 |
| 4,418,982 | 12/1983 | Williams | 350/96.20 |
| 4,500,166 | 2/1985 | Kunze | 350/96.20 |
| 4,516,818 | 5/1985 | Johnston et al. | 439/125 X |
| 4,545,644 | 10/1985 | De Veau et al. | 350/96.21 |
| 4,556,281 | 12/1985 | Anderton | 350/96.20 |
| 4,589,939 | 5/1986 | Mohebban et al. | 156/49 |
| 4,595,256 | 6/1986 | Guazzo | 350/96.21 |
| 4,619,499 | 10/1986 | Gerber | 350/96.20 |
| 4,627,686 | 12/1986 | Szentesi | 350/96.20 |
| 4,666,240 | 5/1987 | Caron et al. | 350/96.20 |
| 4,673,246 | 6/1987 | Schembri | 350/96.22 |
| 4,684,764 | 8/1987 | Luzzi et al. | 174/91 |
| 4,687,289 | 8/1987 | De Santi | 350/96.20 |
| 4,691,986 | 9/1987 | Aberson et al. | 350/96.21 |
| 4,702,551 | 10/1987 | Coulombe | 350/96.20 |
| 4,743,088 | 5/1988 | Balyasny et al. | 350/96.20 |
| 4,744,622 | 5/1988 | Cherry et al. | 350/96.20 |
| 4,753,499 | 6/1988 | Malkani et al. | 350/96.20 |
| 4,754,876 | 7/1988 | Noon et al. | 350/96.20 X |
| 4,761,052 | 8/1988 | Buekers et al. | 350/96.20 |
| 4,765,709 | 8/1988 | Suillerot et al. | 350/96.20 |
| 4,767,181 | 8/1988 | McEowen | 350/96.21 |

FOREIGN PATENT DOCUMENTS

| | | | |
|---|---|---|---|
| 56-12607 | 2/1981 | Japan | 350/96.21 X |
| 57-108817 | 7/1982 | Japan | 350/96.20 |

OTHER PUBLICATIONS

*Lightwave Digest,* Issrue No. 2, 1987, p. 5.

Primary Examiner—William L. Sikes
Assistant Examiner—Brian M. Healy
Attorney, Agent, or Firm—Edward W. Somers

[57] ABSTRACT

A closure (20) for optical fiber cables each including at least one optical fiber (38) and a metallic shield (47) enclosed in a jacket (48) includes a splice tray (22), a bonding and gripping assembly (26) and mating cover portions (27, 29). The splice tray includes provisions (24) on one side thereof for holding an optical fiber splice such as one which may be made by a rotary splice and a raceway (51) for routing the optical fiber to the splice. Metallic conductors (45—45), if included in the cables, may be spliced on an opposite side of the splice tray. The bonding and gripping assembly is attached to the splice tray and includes opposed projecting portions (78—78) and ferrules (71—71). Each cable to be spliced is routed to the bonding and gripping assembly to cause each projecting portion to be inserted into a cable end between the shield and core thereof to establish an electrical connection with the shield and to cooperate with the associated ferrule to grip the cable end portion. The mating cover portions have an oval shape in transverse cross section and are moved over the splice tray and secured together.

14 Claims, 6 Drawing Sheets

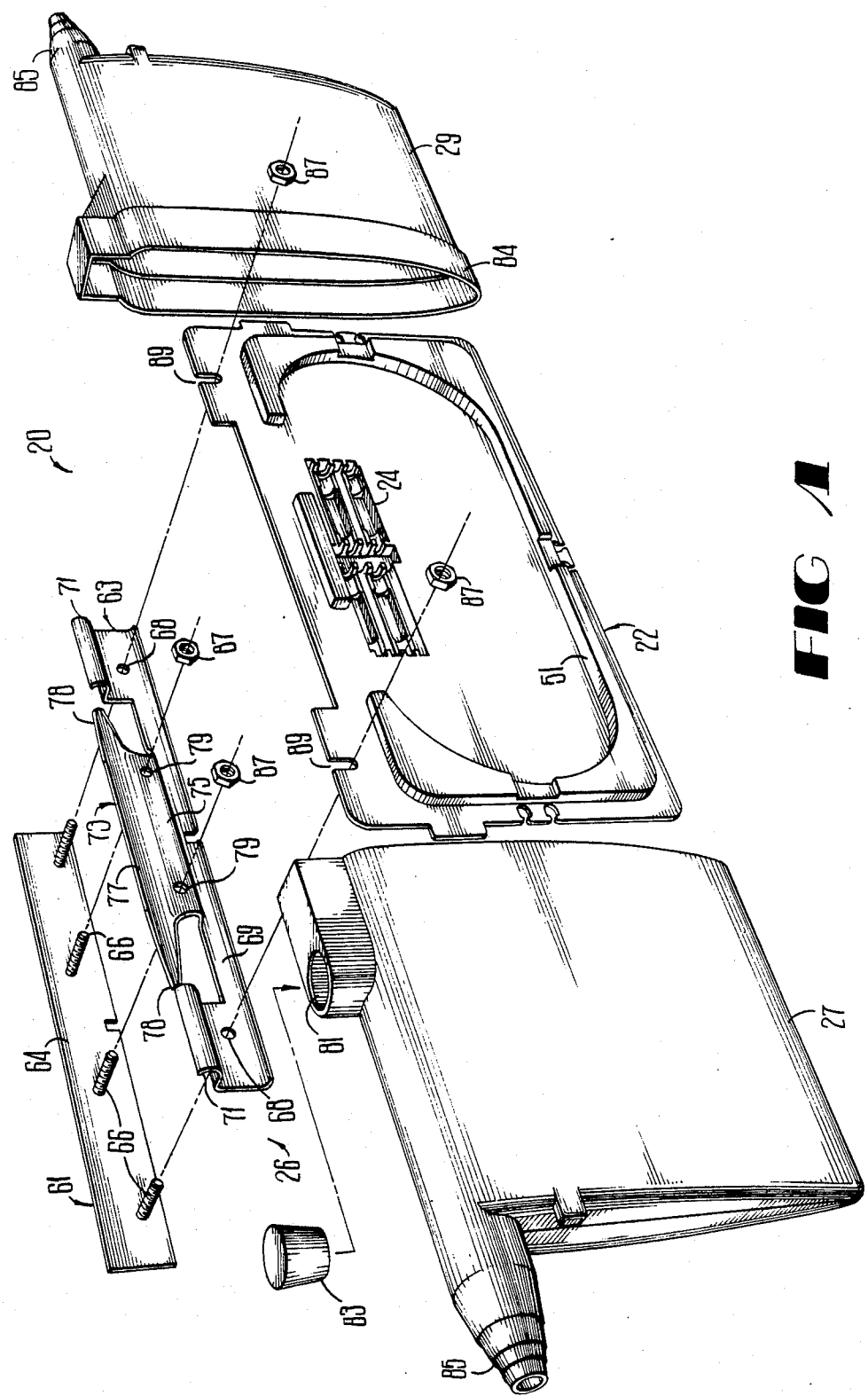

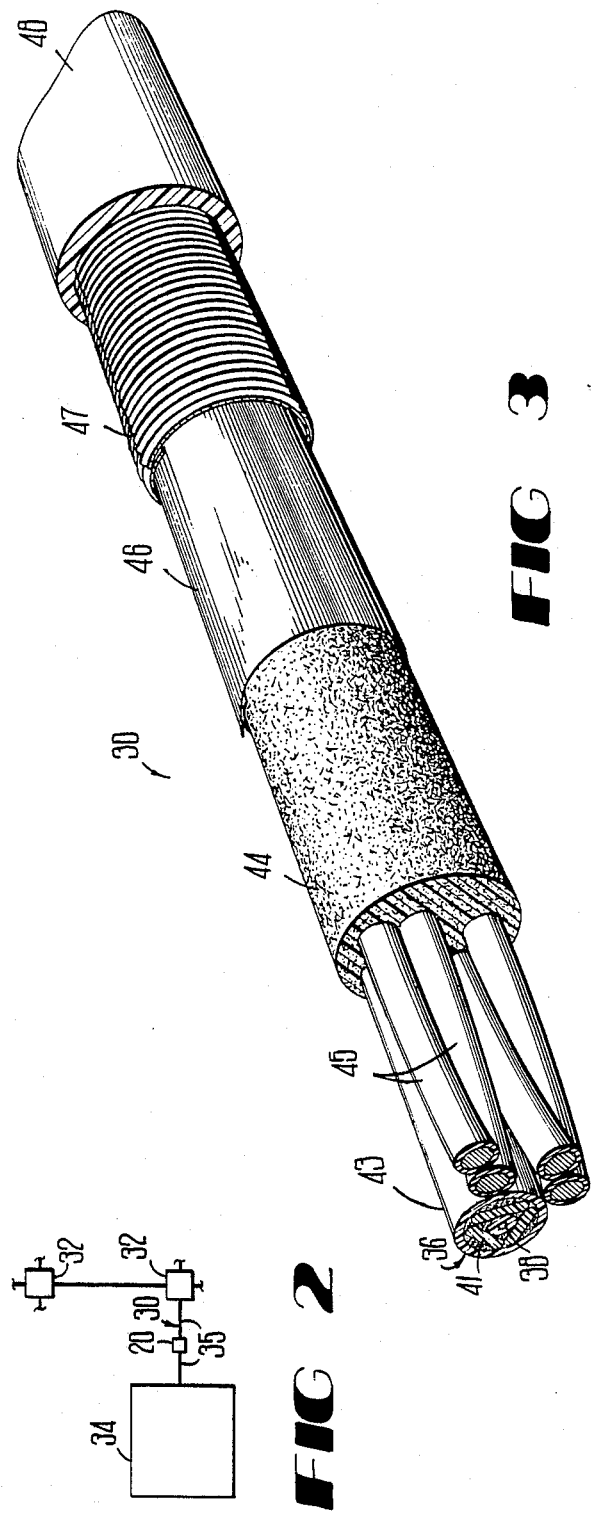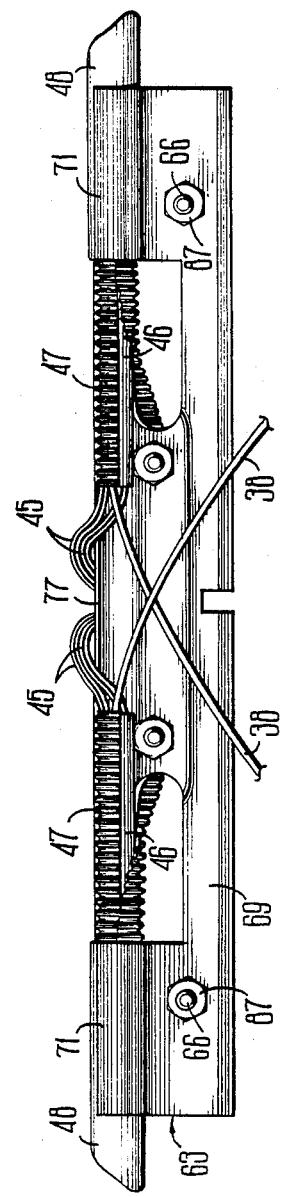

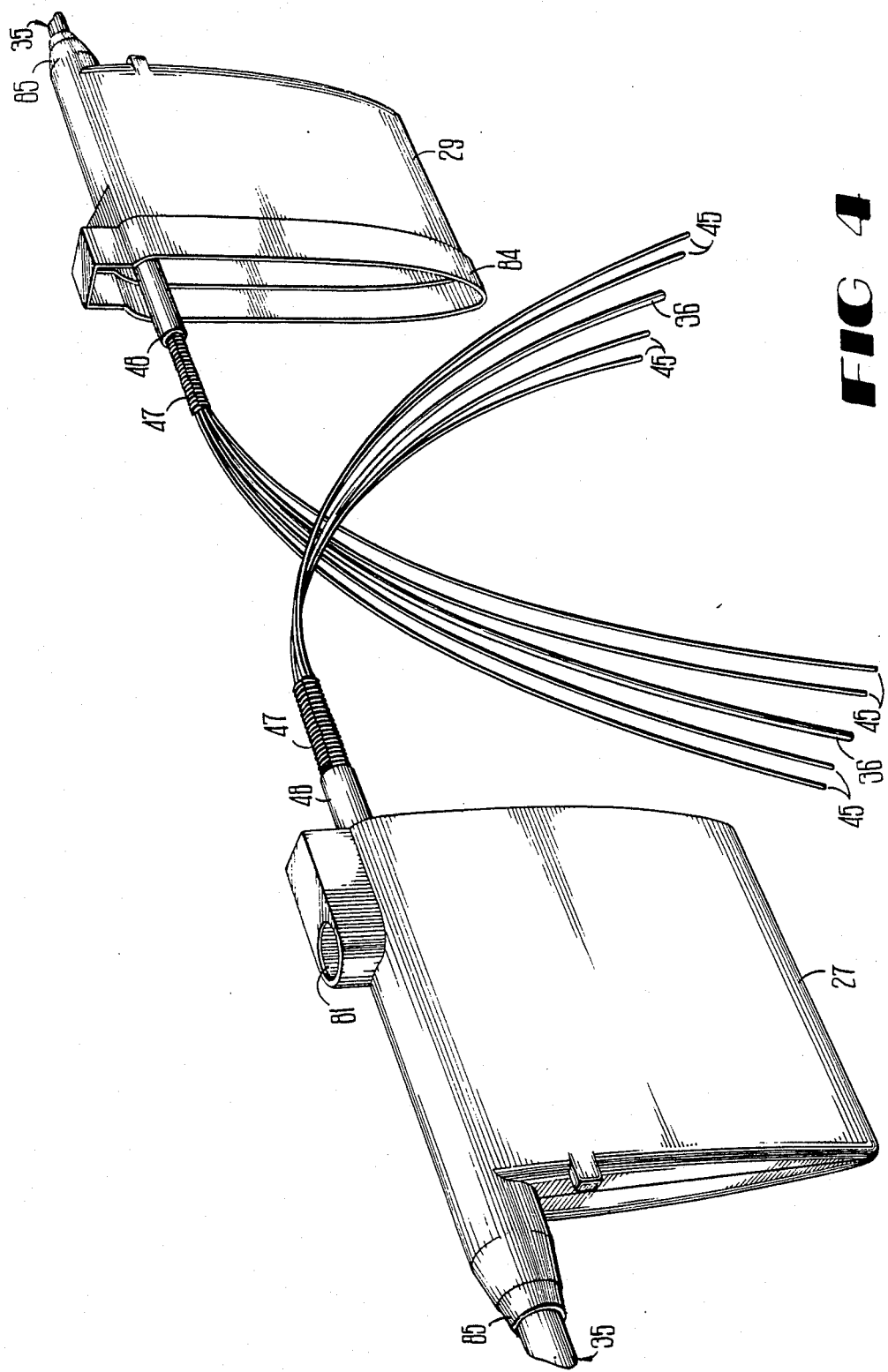

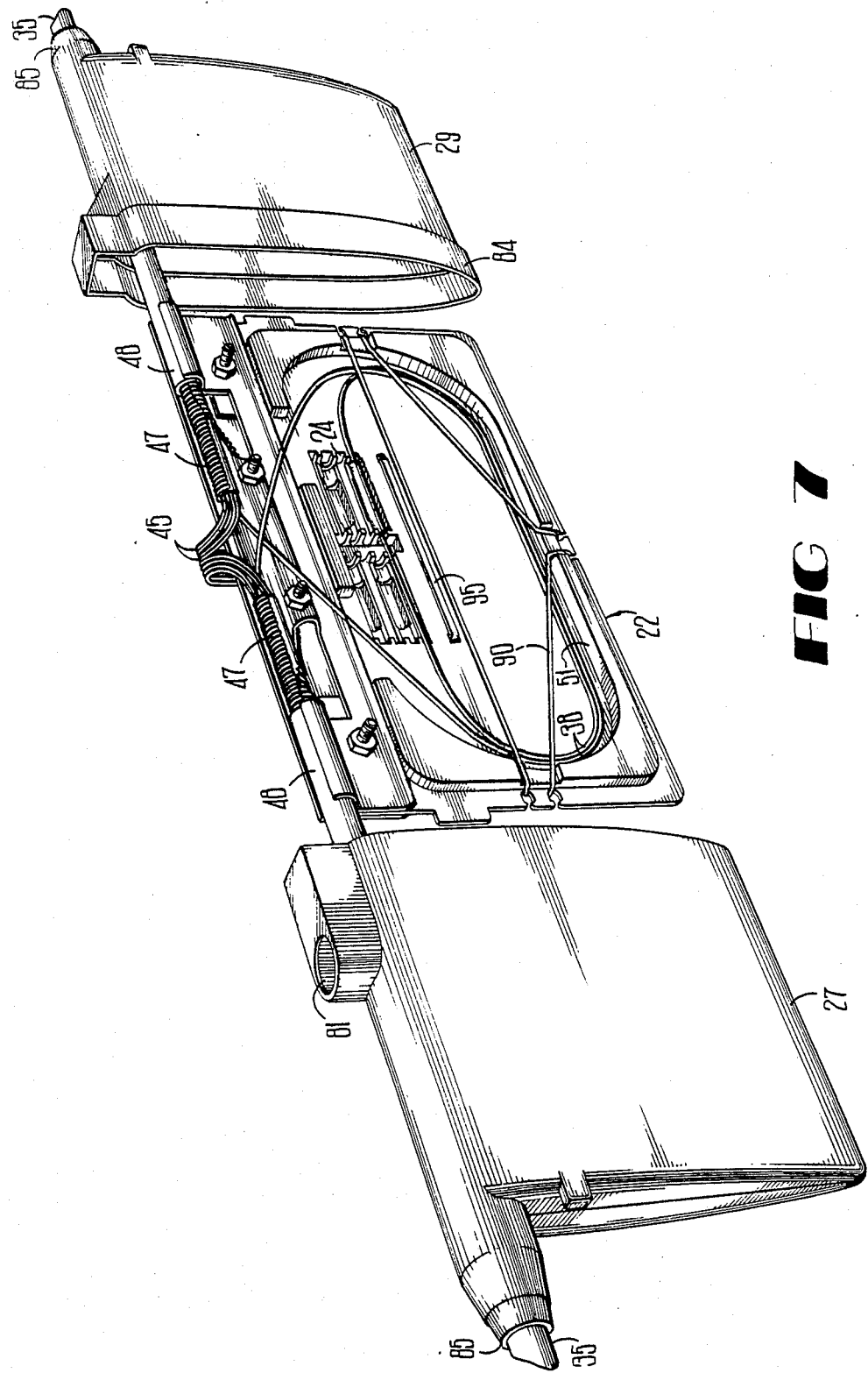

CABLE CLOSURE AND METHODS OF ASSEMBLING

TECHNICAL FIELD

This invention relates to a cable closure and to methods of assembling. More particularly, it relates to a buried closure which may be used to enclose a splice of a drop cable which has been damaged.

BACKGROUND OF THE INVENTION

Telephone service to the home has been provided by buried service wire. Typically each of these has included a pair of metallic conductors such as copper wires enclosed in a jacket.

The use of optical fibers in communications has grown significantly over the past few years. It is anticipated that their use will reach into the residential loop distribution system in the near future. For now, loop distribution cables which include insulated metallic conductors continue to be installed.

As one alternative, operating telephone companies have expressed a desire to install composite cables which include optical fibers as well as metallic conductors. Such a course of action of early placement of optical fibers in buried installations to customers' premises will facilitate the later transition from a metallic to an optical fiber operating system. Obviously, the first cost of installing optical fiber to customers' premises is minimized by such an approach. With such a composite cable, optical fiber can be provided to customers' premises awaiting the arrival of the optical fiber network and development of associated hardware and electronics.

Such composite cables will be placed by the same methods and apparatus as are used for installing buried copper cables. Accordingly, the optical fiber portion thereof is robust enough to withstand plowing and trenching and is capable of survival outside the host structure in a separate run to an optical fiber storage or termination point.

With such a cable structure in place, service will evolve from the metallic pairs to the optical fibers. Simple telephone service can begin immediately over a metallic pair of conductors. Other metallic conductor pairs of the distribution and service cable can serve as secondary lines or alarm circuits. Initially, the optical fiber unit may be used to provide cable television or retained for later use.

At a later date, more sophisticated offerings which require increased bandwidth and customer interaction such as, for example, electronic newspapers and mail, catalogs and shopping, banking and business activities and data and computer functions may be served through a remote terminal. For this application, metallic conductor pairs may provide power to on-premise electronics or serve as control circuits. Still later, all offerings may be provided over the optical fiber media, but power still will have to be provided for on-site electronics by the power or telephone operating company. Providing power from a central office source through these structures should result in reliable telecommunications during power outages. Also, the copper conductor pairs may have other uses such as circuit maintenance, for example.

An important consideration relates to the repair of buried optical fiber cable. Should the optical fiber cable which extends to the home or to a splice point be damaged by construction equipment or by a homeowner, provisions must be made for repairing the cable without entering the splice on the distribution cable. There may be sufficient slack in the severed cable which extends to the home to permit splicing. If not, the cable from a buried splice closure to the home may be replaced, or an additional length of cable may be installed in the vicinity of the damaged portion, requiring two closures.

Whatever splice arrangement is used, such as the so-called rotary mechanical splice, for example, provisions must be made for protecting the splice and storing necessary fiber slack. The rotary mechanical splice is disclosed in U.S. Pat. No. 4,545,644 which issued on Oct. 8, 1985 in the names of G. F. DeVeau and C. Miller. Protection of the splice is accomplished by providing a closure which is destined to be buried and which is capable of maintaining its integrity in a buried environment.

Desirably, such a closure must possess certain attributes. For example, it must be low in cost, it must be adept to splice low fiber count cables and designed so that an encapsulant which is introduced thereto will reach the splice and the stored fiber. Furthermore, inasmuch as fiber ready cables, such as that, for example, disclosed in application Ser. No. 19,719 filed on Feb. 27, 1987, pending, in the names of F. J. Mullin and W. C. Reed includes copper as well as optical fibers, the sought-after closure must be able to accommodate the splicing of copper conductors as well as optical fibers. Also, the sought after closure should be capable of resisting the crushing effect of the earth above it as well as the pulling forces which may be applied to the cables.

In another approach, instead of incorporating optical fiber along with metallic conductors in a single cable structure and await later connection of the optical fiber while using presently the metallic conductors optical fiber cable may be extended from a remote terminal to a buried closure. The buried closure becomes a splice point when the fiber is to be connected to a home at some later date. For this arrangement to be economically feasible, the cost of the buried closure must be relatively low.

Seemingly, the prior art does not include such a closure which is inexpensively priced to be useful for use in providing a repair splice. Although the sought after closure may satisfy a need in the immediate future for repair splices, it may become useful to provide splice points now for future buried optical fiber which will be extended to customer premises.

SUMMARY OF THE INVENTION

The foregoing problems have been solved by the closure of this invention. It includes a splice tray which includes facilities for holding an optical fiber splice and required fiber slack on one side thereof. Any suitable splice connector may be used on the one side of the splice tray to provide the splice between portions of a severed cable, for example. Should copper conductors be included in the cable to be spliced, the copper conductors are caused to become disposed on the other side of the splice tray. A bonding and gripping assembly is adapted to be mounted on the splice tray and includes portions adapted to be inserted into the two cable lengths to be spliced together. Each of those portions is inserted between a shield and an adjacent portion of a cable to establish electrical contact with the shield. The closure also includes mating cover portions which are adapted to be moved in engagement with each other.

After having been moved into engagement with each other, the two cover portions are secured together by suitable means such as by wrapping a suitable tape about portions adjacent to the line of juncture between the two. Each cover portion is such that an entry portion thereof may accommodate any of a range of cable sizes.

During assembly of the closure, a clamp is attached loosely to a backing plate of the bonding and gripping assembly. Each end portion of the clamp includes a ferrule which has an arcuate shape. Each of the ferrules is adapted to be clamped about an outer portion of the cable. The clamp also includes a T-shaped portion with the cross part thereof including opposed projecting portions. Each projecting portion is adapted to become disposed in an end portion of the cable between a metallic shield and another portion of the cable. The insertion of the projecting portions establishes electrical continuity between the cable shields of the two cable portions to be spliced together.

BRIEF DESCRIPTION OF THE DRAWING

Other features of the present invention will be more readily understood from the following detailed description of specific embodiments thereof when read in conjunction with the accompanying drawings, in which:

FIG. 1 is an exploded perspective view of the closure of this invention;

FIG. 2 is a plan view of a distribution arrangement in which closures of this inventin may be used;

FIG. 3 is a perspective view of one kind of cable with which the closure of this invention may be used;

FIG. 4 is a perspective view which shows two cover portions of the closure prior to assembly and end portions of cable such as that shown in FIG. 3 extending through the cover portions;

FIG. 6 is an enlarged side elevational view of the bonding and gripping assembly after it has been assembled and connected to end portions of two cables to be spliced together;

FIG. 7 is a perspective view of the closure of FIG. 1 with two optical fiber cables having end portions held between a clamp and a backing plate of the bonding and gripping assembly and with portions of the fibers disposed about a racetrack of the splice tray and connected together by means of a splice.

DETAILED DESCRIPTION

Figure 5:
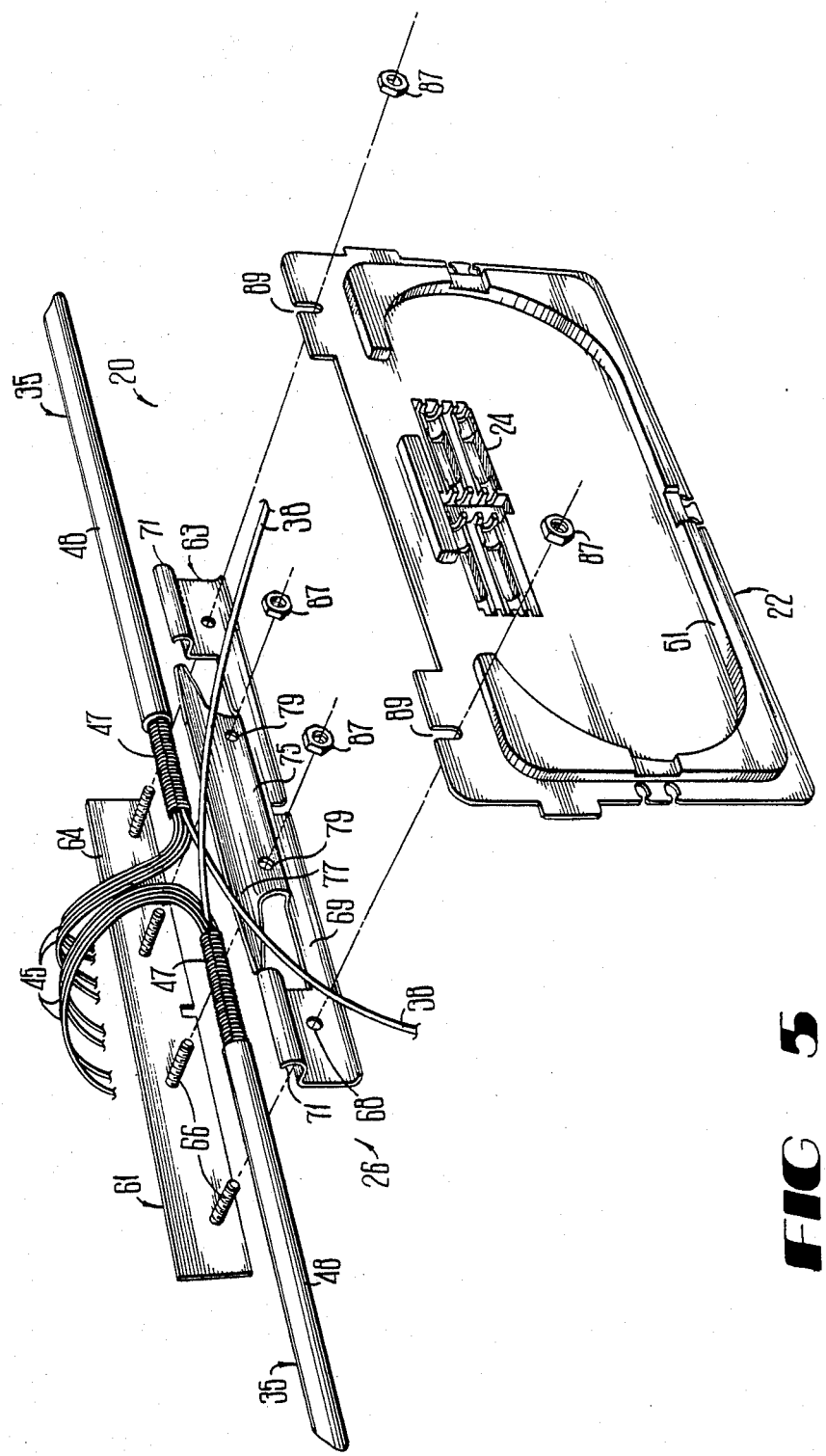
FIG. 5 is an exploded perspective view of a bonding and gripping assembly together with a splice tray prior to assembly with cable end portions in position for splicing.

Referring now to FIG. 1, there is shown an exploded perspective view of a buried closure which is designated generally by the numeral 20. The closure 20 includes a plastic splice tray 22, a splice holder 24, a bonding and gripping assembly designated generaly by the numeral 26 and two mating cover portions 27 and 29.

Typically, a cable 30 (see FIG. 2) is used to connect a customer's premises 34 to the network at a distribution closure 32. Should the cable 30 be severed or crushed, end portions 35-35 thereof must be spliced together with the splice being protected in one of the closures 20-20.

The cable 30 includes a reinforced fiber unit 36 (see FIG. 3) comprising an optical fiber 38, which includes a coating, and a plurality of fiberglass strength members 41-41 arrayed thereabout. Typically, the optical fiber 38 is buffered and hence includes a layer of plastic such as polyvinyl chloride (PVC), for example, which encloses the coating of the optical fiber. The strength members 41-41 and optical fiber 38 are enclosed by a plastic jacket 43. The reinforced fiber unit and a plurality of pairs of insulated metallic conductors 45-45 and a suitable waterblocking material 44 are enclosed in a plastic core wrap 46, a corrugated metallic shield 47 having a longitudinal seam and a plastic jacket 48. A composite cable including a reinforced optical fiber unit is disclosed in priorly identified, commonly assigned application Ser. No. 19,719 which was filed on Feb. 27, 1987 in the names of F. J. Mullin and W. C. Reed.

The splice tray 22 may be molded from a rigid plastic material such as polycarbonate, for example, and includes facilities for holding a length of each of the optical fibers 38-38 from cables which are to be spliced. Also, the splice tray 22 includes the splice holder 24 for holding a plurality of splicing connectors (not shown). Preferably, the splice holder is molded integrally with the tray 22 on one side thereof. Typically, the tray 22 may accommodate as many as four splicing connectors. Such a splicing connector may be that disclosed and claimed in U.S. Pat. No. 4,545,644 which issued on Oct. 8, 1985 in the names of G. DeVeau and C. Miller or that disclosed and claimed in U.S. Pat. No. 4,691,986 which issued on Sept. 8, 1987 in the names of J. Aberson, et al. In the alternative, the optical fibers may be spliced together by means of a fusion splice. As can best be seen in FIG. 1, the splice tray 22 includes a raceway 51 in which loops of the optical fiber or fibers from the two cable portions 35-35 to be spliced become disposed.

On the other side of the splice tray 22 may be disposed end portions of the copper conductors 45-45 of the cable portions 35-35 which are to be spliced together. It is beneficial to maintain the copper conductors separate and apart from the optical fiber connectors.

The bonding and gripping assembly 26 includes a backing plate 61 and a clamp 63. After it has been assembled and caused to establish an electrical connection with the shield of each cable portion 35 to be spliced together, electrical continuity is carried across the splice to a remote ground point.

The backing plate 61 includes a plate 64 and a plurality of threaded posts 66-66 upstanding therefrom. Outer ones of the posts 66-66 are destined to be received in openings 68-68 of the clamp 63. Further, as can be seen, the clamp 63 includes a center body portion 69 and two ferrule end portions 71-71. Each of the ferrule end portions 71-71 has an accurate configuration in transverse cross section which is adapted to conform generally to the outside contour of any of a range of cable sizes. Each ferrule end portion 71 is adapted to become engaged with an unstripped end portion of one of the cable portions 35-35 to be spliced together.

Between the ferrule end portions 71-71 of the clamp 63 is disposed a T-section 73 which is attached to the center body portion 69. The T-shaped section 73 includes a post 75 and a cross-member 77. The post 75 includes two holes 79-79 through which are adapted to be moved the inner two of the threaded posts 66-66 of the plate 64. Each end 78 of the cross member 77 has a somewhat arcuately shaped transverse cross section which is tapered in a longitudinal direction. As such, each free end portion of the cross member 77 is adapted to be inserted into an end portion of a cable portion 35 to be spliced to establish electrical engagement with a shield of the cable.

The closure 20 also includes the pair of mating cover portions 27 and 29. Each of these has an oval shape in cross section transverse of the axes of the cable end portions. Advantageously, the cover portions 27 and 29 are made of a plastic material which not only resists deterioration in a buried environment but also which in the oval shaped configuration is capable of resisting crushing loads of earth overhead when in a buried environment. It should be observed from FIG. 1 that the cover portion 27 includes a port 81 in which is disposed a plug 83. The port 81 is used to allow introduction of an encapsulating material into the closure after the cover portions have been assembled. Also, the cover portion 29 includes a collar 84 which is adapted to receive an end portion of the cover portion 27. After the two cover portions 27 and 29 have been assembled, provisions are made for securing them together.

As mentioned hereinbefore, the closure 20 is adapted to enclose the end portions of a range of cable sizes. In order to accommodate entry of any of a range of cable sizes, each cover portion 27 and 29 is provided with a tapered entrance nozzle 85. Each nozzle 85 may be cut by an installer to accommodate the outer diameter of the cable being spliced.

As was seen in FIG. 2, such a cable 30 is routed from a distribution point to a customer's premises 34. It is buried and includes sufficient slack to facilitate splicing should it be required because of cable damage. Generally, each of the cable portions 35-35 to be spliced includes a corrugated metallic shield 47 which provides flexibility and strength for the cable. Also, it dissipates electromagnetic radiation and provides lightning and rodent protection. Of course, if two portions of such cable are to be spliced together, electrical continuity from the shield of one cable end portion to the shield of the other end portion must be carried across the splice.

For purposes of describing the method of using the closure 20, it is assumed that the cable 30 which has been severed or crushed to necessitate splicing of two portions 35-35 thereof includes at least one optical fiber which in a damaged cable would require splicing and at least one pair of metallic conductors which also would require splicing.

In a first step of splicing two end portions of a cable 30 which has been severed, the jacket 48 is slit for a predetermined distance along each cable end portion and removed. The outer diameter of the cable 30 is determined and the nozzle 85 of each cover portion 27 and 29 is cut to accommodate that size. One end portion of one cable portion 35 is routed through the nozzle 85 of one cover portion 27 and other end portion of a cable portion 35 is inserted through the nozzle of the other cover portion 29 (see FIG. 4). Then the corrugated shield 47 and core wrap 46 are removed beginning at a point about 2.54 cm from the peripheral end of the outer jacket 48, exposing the insulated metallic conductors 45-45 and the optical fiber or fibers.

Next, the copper conductors are moved aside, and the jacket 43 and the strength members 41-41 removed to expose the fiber or fibers. The lengths of the exposed optical fibers 38-38 and metallic conductors 45-45 are exaggerated in FIG. 4. The strength members 41-41 are cut and the buffered fiber is wiped clean. The clamp 63 and the backing plate 61 are preassembled (see FIG. 5) by causing each of the threaded posts 66-66 to become aligned with and extend through aligned openings 68-68 and 79-79 in the clamp. Nuts 87-87 are turned partially into the posts 66-66 after which a cable end portion 35 is moved to cause the corrugated shield 47 thereof to be moved in a longitudinal direction between the clamp 63 and the backing plate 61. This causes an end portion 78 of the clamp 63 to be moved between the shield 47 and adjacent portions of the cable portion 35 (see FIG. 6). The longitudinal motion is discontinued when the corrugated shield 47 is adjacent to the second threaded post from the adjacent free end of the backing plate 61. At that time, the nut 87 on the second post is tightened. This procedure is repeated for the other cable end portion 35. Afterwards, the splice tray 22 is inserted into the opening between the cables to cause slots 89-89 thereof to be moved over the two outermost posts 66-66 (see FIG. 1). The nuts 87-87 previously partially turned onto the outermost posts 66-66 are tightened to secure the splice tray 22 to the bonding and gripping assembly 26 and grip the cable end portions 35-35 between the clamp 63 and the backing plate 61. Also, this causes an electrical connection between the cable shields 47-47 and the backing plate 61 to be established.

The metallic conductor pairs 45-45 are spliced and secured to the backside of the splice tray as seen in FIG. 7 with a small cable tie 95. Any of a number of numerous commercially available splice connectors such as that disclosed in U.S. Pat. No. 3,772,635 which issued on Nov. 13, 1973 in the names of D. R. Frey, for example, may be used to splice the metallic conductors. Then the buffered optical fibers 38-38 are routed along the raceway 51 (see again FIG. 7) and spliced, for example, with the priorly mentioned rotary splice connector. An elastic band 90 is wrapped about the tray to hold th optical fibers 38-38 in place.

Figure 8:
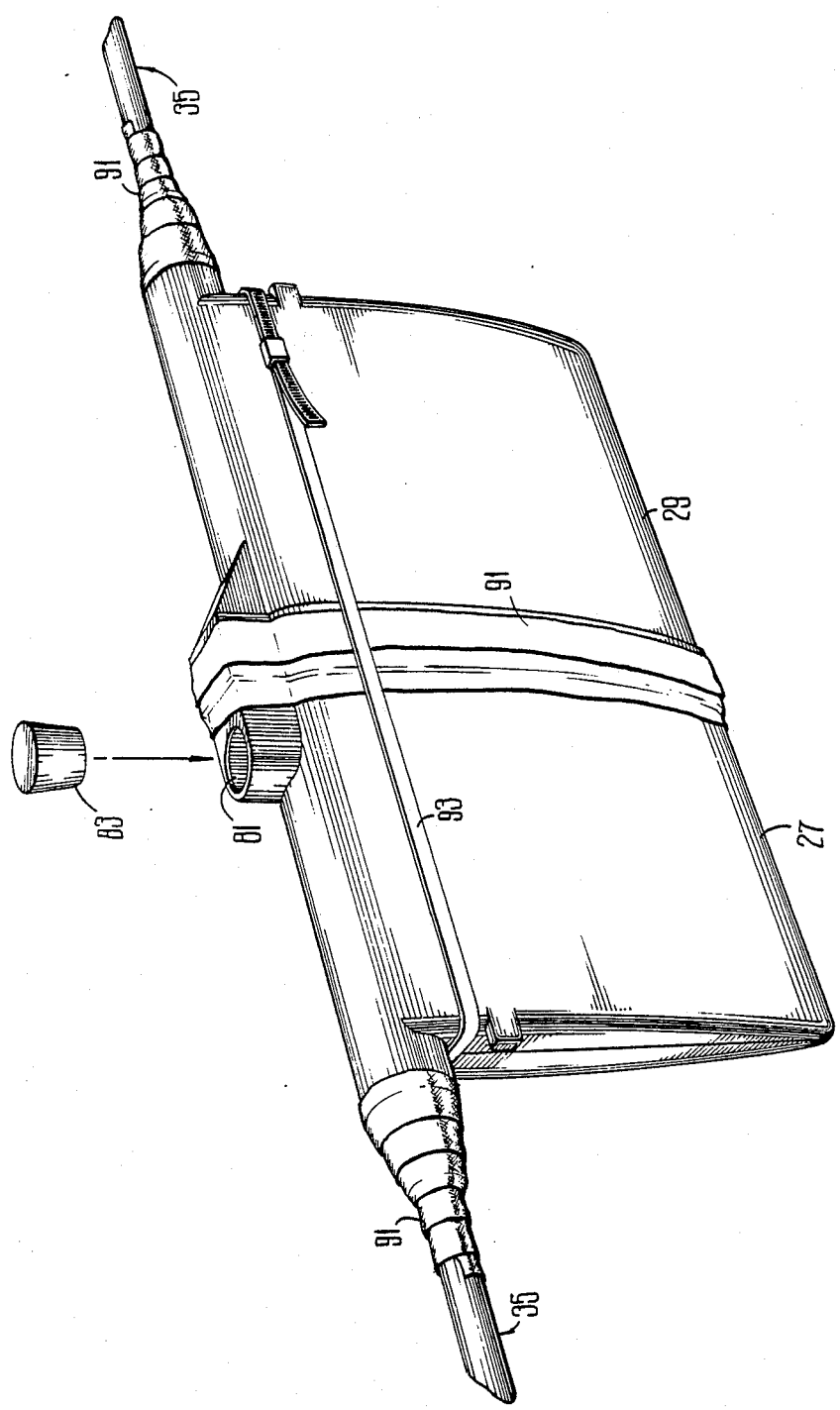
FIG. 8 is a perspective view of the closure of FIG. 1 after it has been used to splice together two cable portions and after the cover portions have been secured together.

In a final sequence of steps, the two cover portions 27 and 29 are moved toward each other to cause the end portion of the portion 27 to be received in the collar 84 of the portion 29 (see FIG. 8). A convolution or convolutions of a vinyl tape 91 are wrapped about the joint between the cover portions 27 and 29 and about the exit points of the end portions of the cables from the nozzles 85-85. A cable tie 93 is placed about the cover portions to secure them together. The plug 83 is removed from the port 81 of the one cover portion 27 and a suitable encapsulant is introduced through the port into the closure. Then the plug 83 is reinserted into the port 81.

It should be mentioned that in the closure 20, the encapsulant is introduced directly into engagement with the splice. This is unlike closures of the prior art in which the splice point is enclosed separately within the closure so that the encapsulant may not reach the splice point. It has been found that direct contact of the encapsulant with the splice point does not affect adversely the transmission performance of the fibers on the electrical conductors, and, of course, enhances the protection of the splice points from moisture.

The closure of this invention has been disclosed with respect to splicing a composite optical fiber-metallic conductor cable. It should be understood that the closure may be used to enclose a splice between portions of an all fiber cable or of an all metallic conductor cable.

It is to be understood that the above-described arrangements are simply illustrative of the invention. Other arrangements may be devised by those skilled in the art which will embody the principles of the invention and fall within the spirit and scope thereof.

What is claimed is:

1. A cable closure for enclosing a splice between two cable portions each of which includes a core, a metallic shield and a jacket, said closure comprising:

a splice tray which includes means for holding a splice on one side thereof;

a bonding and gripping assembly which is adapted to be assembled with said splice tray and which includes opposing portions adapted to be engaged with the shields and adjacent portions of the cable portions to establish electrical contact with the shields and to grip the jackets of the cable portions; and mating cover portions which are adapted to be moved toward each other to enclose said splice tray and to be secured together.

2. The closure of claim 1, wherein said bonding and gripping assembly includes a backing plate and a clamp, said clamp including a ferrule portion at each end thereof each for becoming disposed in engagement with an outer portion of an associated cable portion and said clamp further including adjacent each end thereof a projecting portion which is adapted to be inserted into an end portion of the associated cable portion to become engaged with a shield of the associated cable portion.

3. The closure of claim 2, wherein said clamp is adapted to be secured to said backing plate after each associated cable portion has been moved toward an end thereof to cause a projecting portion of the clamp adjacent to that end to be moved into the end portion of the associated cable portion and become engaged with the shield thereof.

4. The closure of claim 2, wherein said clamp includes a longitudinally extending portion to ends of which are attached ferrule portions for engaging the jacket of each cable end portion and a stem projecting from said longitudinally extending extending portion, said clamp further including opposed bonding portions attached to said stem and each adapted to be inserted into a cable end portion to engage electrically the shield thereof.

5. The closure of claim 1, wherein said splice tray also includes at least one nest for holding means for splicing two optical fibers.

6. The closure of claim 1, wherein one of said cover portions includes a port to facilitate the introduction of encapsulant into said closure.

7. The closure of claim 1, wherein one of said cover portions includes an open end having an annular collar disposed thereabout to receive a peripheral end portion of the other cover portion.

8. The closure of claim 1, wherein each of said cover portions has an oval shaped cross section transverse of the axes of the cable portions.

9. The closure of claim 1, wherein each of said cover portions includes an open end and a closed end having a nozzle extending therefrom, the cover portions adapted to be assembled by causing relative movement therebetween to cause an open end portion of one to be received in the open end portion of the other, each of the nozzles of each cover portion capable of being severed to accommodate the entry of a cable end portion to be spliced into the associated cover portion.

10. A method of providing a closure for an optical fiber splice, said method including the steps of:

moving one cover portion over an end of a cable end portion of a first optical fiber cable to be spliced and another cover portion over an end of a second optical fiber cable which is to be spliced to the first cable, each of the cables including at least one optical fiber;

removing a metallic shield and jacket from a length of each cable end portion and exposing the at least one optical fiber of each cable end portion;

causing end portions of a bonding and gripping assembly to be moved between the metallic shields and cores of the cable end portions;

splicing the optical fiber of one end portion of the first cable to the optical fiber of an end portion of the second cable;

moving the cover portions into engagement with each other to enclose the optical fiber splice; and securing together the cover portions.

11. The method of claim 10, wherein said method also including the steps of:

causing a splice tray to be secured to the bonding and gripping assembly; and causing the optical fiber splice to be supported on one side of the splice tray.

12. The method of claim 11, wherein each cable also includes metallic conductors, said method also including the steps of:

splicing the metallic conductors of the first cable to the metallic conductors of the second cable; and causing the spliced metallic conductors to be disposed on the other side of the splice tray.

13. The method of claim 11, which also includes the step of introducing an encapsulant into the closure.

14. The method of claim 10, which prior to the movement of a cover portion over each cable portion includes the step of causing a nozzle which extends from the cover portion to be sized to permit the end portion of the cable to be moved through the nozzle.

* * * * *